US008326789B2

(12) United States Patent
Johnson et al.

(10) Patent No.: US 8,326,789 B2
(45) Date of Patent: Dec. 4, 2012

(54) EXPERT SYSTEM INTEGRATED WITH REMOTE PERFORMANCE MANAGEMENT

(75) Inventors: Karl Johnson, Mt. Prospect, IL (US); Christophe Romatier, Chicago, IL (US); Kirk McNamara, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 657 days.

(21) Appl. No.: 12/544,846

(22) Filed: Aug. 20, 2009

(65) Prior Publication Data

US 2011/0047115 A1    Feb. 24, 2011

(51) Int. Cl.
*G06F 17/00*    (2006.01)
*G06F 11/00*    (2006.01)

(52) U.S. Cl. ............................ 706/50; 714/26; 714/47.1
(58) Field of Classification Search .................. None
See application file for complete search history.

(56) References Cited

U.S. PATENT DOCUMENTS

| | | | | |
|---|---|---|---|---|
| 5,631,831 A * | 5/1997 | Bird et al. | ..................... | 701/34.4 |
| 6,473,659 B1 * | 10/2002 | Shah et al. | ..................... | 700/79 |
| 6,646,564 B1 * | 11/2003 | Azieres et al. | ................. | 340/679 |
| 6,952,688 B1 | 10/2005 | Goldman | | |
| 7,213,174 B2 * | 5/2007 | Dahlquist | ....................... | 714/37 |
| 2002/0116079 A1 | 8/2002 | Kern | | |
| 2002/0123864 A1 | 9/2002 | Eryurek | | |
| 2004/0122709 A1 | 6/2004 | Avinash | | |
| 2004/0153437 A1 | 8/2004 | Buchan | | |
| 2004/0249914 A1 * | 12/2004 | Flocken et al. | ................ | 709/223 |
| 2004/0250163 A1 * | 12/2004 | Roddy et al. | ..................... | 714/25 |
| 2005/0289232 A1 | 12/2005 | Ebert | | |
| 2006/0073013 A1 | 4/2006 | Emigholz | | |
| 2007/0250292 A1 | 10/2007 | Alagappan | | |
| 2008/0097637 A1 | 4/2008 | Nguyen | | |
| 2008/0111993 A1 * | 5/2008 | Miller | ........................... | 356/437 |
| 2008/0120060 A1 | 5/2008 | Kant | | |

FOREIGN PATENT DOCUMENTS

| WO | 2008157505 | 12/2008 |
|---|---|---|
| WO | 2009020861 | 2/2009 |
| WO | 2009023659 | 2/2009 |

OTHER PUBLICATIONS

Liu et al., "Fault Detection, Diagnostics, and Prognostics: Software Agent Solutions", Jul. 2007, Transactions on Vehicular Technology, vol. 56 No. 4, pp. 1613-1622.*

Vedam H., et al., "Signed Digraph Based Multiple Fault Diagnosis [can save money for the petrochemical industry]", Process Systems Engineering (PSE) 6th International Symposium/30th European Computer Aided Process Engineering (ESCAPE-7) Symposium (Trondheim, Norway May 25-29, 1997) Computers & Chemical Engineering (ISSN 0098-1354) V21 No. Supplement S655-S660 (May 20, 1997) Elsevier.

(Continued)

*Primary Examiner* — Alan Chen
*Assistant Examiner* — Paulinho E Smith
(74) *Attorney, Agent, or Firm* — Maryann Maas

(57) ABSTRACT

The invention relates to a method of troubleshooting process issues using an Expert System. More specifically, the invention involves transmitting, to an Expert System, Remote Performance Management (RPM) data based on Distributed Control System (DCS) information and subsequently translating the RPM data. The Expert System determines a solution along with an associated confidence level. The Expert System may prioritize the solution and simultaneously signal the DCS to automatically implement the transmitted solution.

17 Claims, 7 Drawing Sheets

OTHER PUBLICATIONS

Salam, Md.S., et al., "Comprehensive Algorithm for Hydrothermal Co-Ordination", IEE Proceedings: Generation, Transmission and Distribution, v 144, n 5, p. 482-488, Sep. 1997.

Lu, Jianjiang, et al., "An Inference Control Algorithm for RDF(S) Repository", Lecture Notes in Computer Science (including subseries Lecture Notes in Artificial Intelligence and Lecture Notes in Bioinformatics), v 4430 LNCS, p. 262-268, 2007, Intelligence and Security Informatics—Pacific Asia Workshop, PAISI 2007, Proceedings Conference: 2007 Pacific Asia Workshop on Intelligence and Security Informatics, PAISI 2007, Apr. 11-12 ,2007.

Koiranen, T., "Computer Aided Process Equipment Selection and Design Using Knowledge Engineering Techniques", Acta Polytechnica Scandinavica, Chemical Technology and Metallurgy Series, n 261, p. 2-33, 1998.

Lee, Li-Wei, et al., "Fuzzy Risk Analysis Based on Fuzzy Numbers with Different Shapes and Different Deviations" Expert Systems with Applications, v 34, n 4, p. 2763-2771, May 2008.

Barber, T.J., Project control strategies using an intelligent knowledge-based system and a heuristic algorithm, Counc. Natl. Acad. Awards , U.K., Diss. , (1988) Abstract.

* cited by examiner

FIG. 6

| Time 602 | RxBedTmp1 604 | Delta RxBedTmp1 606 | 25th Percentile (Previous 30-days) 608 | 50th Percentile – median (Previous 30-days) 610 | 75th Percentile (Previous 30-days) 612 | Does RxBedTmp1 Lie Within the Middle 50% of Data 1="Yes", 0= "No"? 614 | Average RxBedTmp1 if Within 50% of Data 616 | Intermediate Calculation 618 | Standard Deviation of Middle 50% Data 620 | What is the ratio of Delta_RxBed Temp1 to Std Dev of Middle 50% of Data? 622 | What is the Level of Alarm? (HIGH: Ratio>10, MEDIUM: 3<Ratio<10, LOW: Ratio<3) 624 |
|---|---|---|---|---|---|---|---|---|---|---|---|
| 8/15/08 0:00 | 138.17 | -5.04 | 136.93 | 139.10 | 140.18 | 1 | 138.64 | 0.22 | 1.7205 | -2.9270 | LOW |
| 8/12/08 0:00 | 143.20 | 3.25 | 136.91 | 139.10 | 140.18 | 0 | 138.66 | 0.00 | 1.7599 | 1.8484 | LOW |
| 8/11/08 0:00 | 139.95 | 2.17 | 136.91 | 139.10 | 139.99 | 1 | 138.72 | 1.51 | 1.7287 | 1.2565 | LOW |
| 8/10/08 0:00 | 137.78 | -2.11 | 136.91 | 139.10 | 139.99 | 1 | 138.70 | 0.84 | 1.7363 | -1.2172 | LOW |
| 8/9/08 0:00 | 139.89 | 0.71 | 136.91 | 139.10 | 139.99 | 1 | 138.74 | 1.32 | 1.7673 | 0.4026 | LOW |
| 8/8/08 0:00 | 139.18 | 2.26 | 136.91 | 139.10 | 139.99 | 1 | 138.66 | 0.25 | 1.7939 | 1.2592 | LOW |
| 8/7/08 0:00 | 136.92 | -2.15 | 136.47 | 138.81 | 139.99 | 1 | 138.68 | 3.00 | 1.8393 | -1.1697 | LOW |
| 8/6/08 0:00 | 139.07 | 2.16 | 136.30 | 183.81 | 139.99 | 1 | 138.76 | 0.10 | 1.8454 | 1.1726 | LOW |
| 8/5/08 0:00 | 136.91 | -3.95 | 136.30 | 138.54 | 139.99 | 1 | 138.74 | 3.34 | 1.9006 | -2.0802 | LOW |
| 8/4/08 0:00 | 140.86 | -0.28 | 136.30 | 138.81 | 140.18 | 0 | 138.95 | 0.00 | 1.8513 | -0.1534 | LOW |
| 8/3/08 0:00 | 141.15 | 0.25 | 136.30 | 138.81 | 140.18 | 1 | 139.07 | 0.06 | 1.7963 | 0.1387 | LOW |
| 8/2/08 0:00 | 140.90 | 0.97 | 136.30 | 138.81 | 140.18 | 1 | 139.18 | 0.41 | 1.7457 | 0.5557 | LOW |
| 8/1/08 0:00 | 139.93 | 2.70 | 136.30 | 138.81 | 140.18 | 1 | 139.29 | 4.68 | 1.6997 | 1.5867 | LOW |
| 7/31/08 0:00 | 137.23 | -1.06 | 136.30 | 138.81 | 140.27 | 1 | 139.40 | 1.58 | 1.7071 | -0.6220 | LOW |
| 7/30/08 0:00 | 138.29 | -4.26 | 136.30 | 138.98 | 140.27 | 1 | 139.55 | 0.00 | 1.6433 | -2.5928 | LOW |
| 7/29/08 0:00 | 142.55 | 3.71 | 136.30 | 139.24 | 140.27 | 0 | 139.65 | 0.70 | 1.6273 | 2.2818 | LOW |
| 7/28/08 0:00 | 138.84 | 1.89 | 136.30 | 139.24 | 140.27 | 0 | 139.68 | 7.97 | 1.6001 | 1.1782 | LOW |
| 7/27/08 0:00 | 136.96 | -2.40 | 136.30 | 139.40 | 140.33 | 1 | 139.78 | 0.51 | 1.5905 | -1.5072 | LOW |
| 7/26/08 0:00 | 139.35 | -0.92 | 136.30 | 139.70 | 140.56 | 1 | 140.06 | 0.03 | 1.4990 | -0.6140 | LOW |
| 7/25/08 0:00 | 140.27 | 0.03 | 136.30 | 139.97 | 140.81 | 1 | 140.10 | 0.06 | 1.5293 | 0.0190 | LOW |
| 7/24/08 0:00 | 140.24 | 0.24 | 136.30 | 139.97 | 140.81 | 1 | 140.26 | 0.14 | 1.6189 | 0.1511 | LOW |
| 7/23/08 0:00 | 140.00 | -0.63 | 136.30 | 139.97 | 140.81 | 1 | 140.25 | 1.24 | 1.6240 | -0.3902 | LOW |
| 7/22/08 0:00 | 140.63 | 1.51 | 136.30 | 139.70 | 140.74 | 1 | 140.26 | 15.90 | 1.6675 | 0.9053 | LOW |
| 7/21/08 0:00 | 139.12 | 2.80 | 135.25 | 139.29 | 140.74 | 1 | 140.24 | 18.36 | 1.7134 | 1.6360 | LOW |
| 7/20/08 0:00 | 136.32 | 0.03 | 135.25 | 139.24 | 140.74 | 1 | 140.31 | 0.00 | 1.7440 | 0.0181 | LOW |
| 7/19/08 0:00 | 136.29 | 1.86 | 135.25 | 139.70 | 140.74 | 1 | 140.57 | 0.00 | 1.4780 | 1.2600 | LOW |
| 7/18/08 0:00 | 134.43 | -0.47 | 135.36 | 139.70 | 140.90 | 0 | 140.88 | 0.00 | 1.0145 | -0.4666 | LOW |
| 7/17/08 0:00 | 134.90 | 2.26 | 136.80 | 140.01 | 140.90 | 0 | 140.88 | 0.00 | 1.0145 | 2.2260 | MEDIUM |
| 7/16/08 0:00 | 132.64 | 5.32 | 137.23 | 140.01 | 140.90 | 0 | 140.88 | 0.00 | 0.9928 | 5.2463 | LOW |
| 7/15/08 0:00 | 127.32 | 2.05 | 138.29 | 140.10 | 140.90 | 0 | 140.88 | 0.00 | 1.0145 | 2.0631 | LOW |
| 7/14/08 0:00 | 125.27 | -14.67 | 138.80 | 140.15 | 140.90 | 0 | 140.84 | 0.00 | 0.9616 | -15.2574 | HIGH |

EXPERT SYSTEM INTEGRATED WITH REMOTE PERFORMANCE MANAGEMENT

FIELD OF THE INVENTION

The disclosure relates to integrating Expert Systems with data collection and monitoring systems to improve troubleshooting of process issues.

BACKGROUND

Currently, Expert Systems (ES) and/or Expert System tools (ES tools) are used to troubleshoot process issues. In an exemplary system, smart questionnaires which ask users questions about the process variables may be utilized. The smart questionnaires can be advantageous since heuristics can be programmed into the decision tree logic. Process technology experts determine these heuristics. These rules of thumb may be modified slightly per customer process unit because these process technologies are adaptable to specific customer demands (i.e. refinery purpose such as maximizing gasoline or diesel, etc. . . . ). ES tools currently in use are used by field service advisors, but can also be used by customers when a process issue develops. However, current Expert Systems are qualitative in nature and are primarily designed for use by experts for consulting purposes.

As shown in FIG. 1, Remote Performance Management (RPM) system 102 collects process variable data from a process unit 104 and records the collected data through use of a Distributed Control System (DCS) 106. DCS system 106 controls process unit 104 through numerous instrumentation and control devices (not shown) found on process unit 104. Process unit 104 operators can manually alter DCS 106 set points to change process variables. Such process variables include but are not limited to temperature and pressure.

When a process problem, such as a process upset, arises on process unit 104, information from DCS 106, which directly controls process variables in an effort to maintain steady-state or pseudo-steady-state, may be used by RPM system 102 to output graphs and trends. The data may then be reviewed by a user 108 (using a workstation or computer) and changes made to DCS 106 set points to alter the process outputs. Depending on the user type (customer, process technology expert, or novice field advisor), an Expert System (ES) system 110 may be consulted offline to assist in determining appropriate process variables to alter. The RPM system 102 is quantitative in nature, thus needing graphical and analytical interpretation by a process technology expert.

A need exists for integrating the RPM system 102 with an ES 110 to assist in the timely and accurate troubleshooting of process problems. The combined system may economically increase yields from existing sources and/or reduce utility energy usage while efficiently resolving process issues more quickly.

SUMMARY

Aspects of the disclosure overcome problems and limitations of the prior art by providing a method of troubleshooting a process unit upset event or anticipated process unit upset event for a process unit.

An aspect of the disclosure includes translation of RPM data which may be quantitative in nature into data for use by an Expert System. In an embodiment, coupling these two systems may decrease the time required for troubleshooting process issues that need to be resolved. In addition, the coupling of these two systems may also reduce the likelihood of a future process unit upset event or eliminate the occurrence.

In an embodiment, information from a RPM flows to an ES and a user. The ES may determine a solution or course of action to overcome the current or anticipated process unit upset. A user may then incorporate both the RPM and ES outputs to finalize the resolution. This resolution would then be routed to the DCS for implementation of the process variable changes.

In an additional embodiment, RPM data flows to a user and an ES. The ES determines a solution and directly makes changes to process variables via the DCS. The user may modify the heuristics of the ES for the particular unit, if desired.

In another aspect of the disclosure, an ES may determine a confidence level in a determined solution based on translated variable data. In addition, the determined solution may be prioritized based on the determined confidence level. The determined solution may be transmitted to a DCS for automatic execution of the determined solution.

The details of these and other embodiments of the present disclosure are set forth in the accompanying drawings and the description below. Other features and advantages of the disclosure will be apparent from the description and drawings.

BRIEF DESCRIPTION OF THE DRAWING

A more complete understanding of the present disclosure and the advantages thereof may be acquired by referring to the following description in consideration of the accompanying drawings, in which like reference numbers indicate like features.

FIG. 6 illustrates a table showing translation of data for use in troubleshooting process issues in accordance with an embodiment of the disclosure.

DETAILED DESCRIPTION

In the following description of the various embodiments reference is made to the accompanying drawings, which form a part hereof, and in which is shown by way of illustration various embodiments in which the disclosure may be practiced. It is to be understood that other embodiments may be utilized and structural and functional modifications may be made without departing from the scope of the present disclosure.

Figure 1:
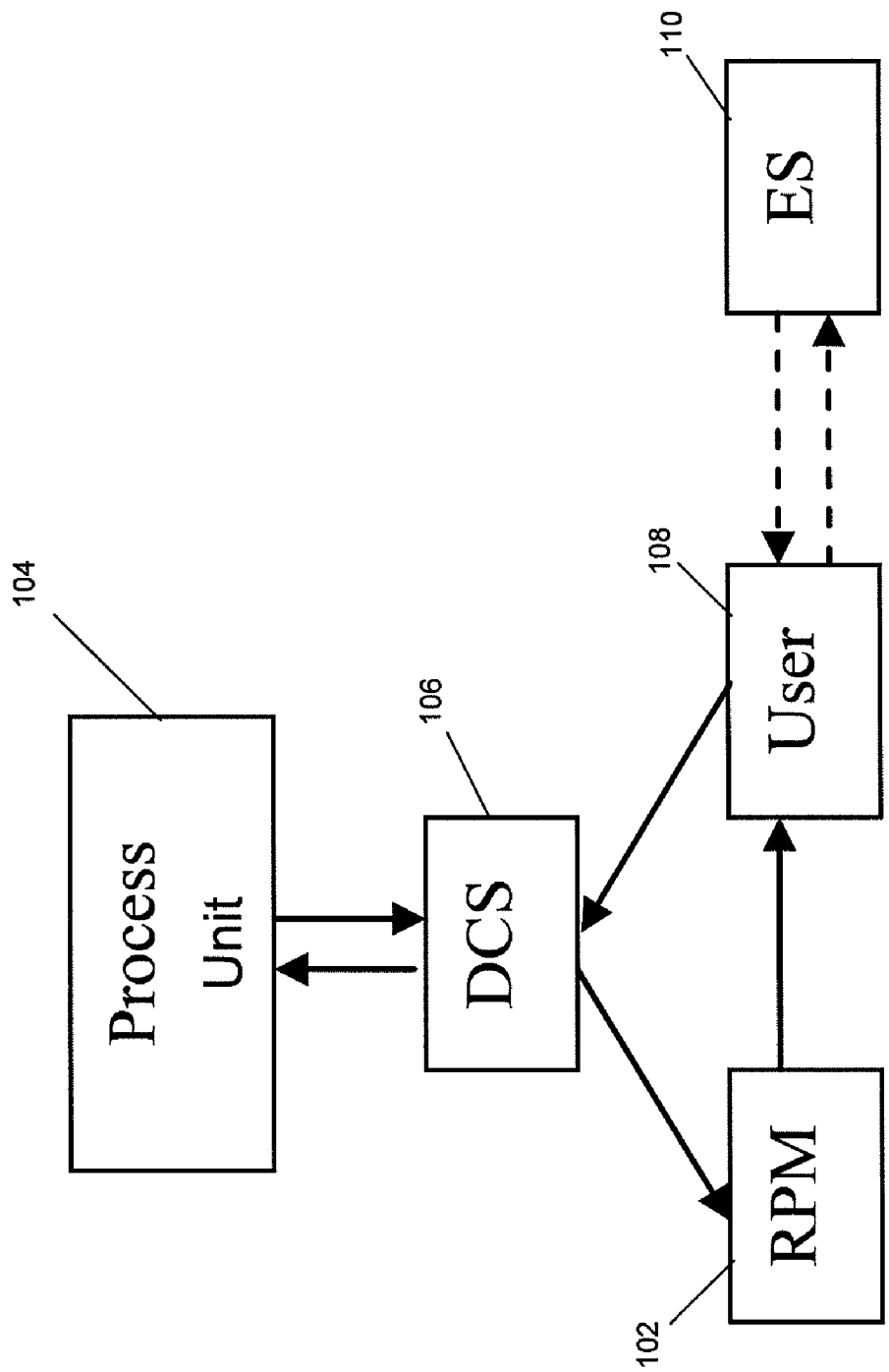
FIG. 1 shows a prior art process for troubleshooting process issues.
Figure 2:
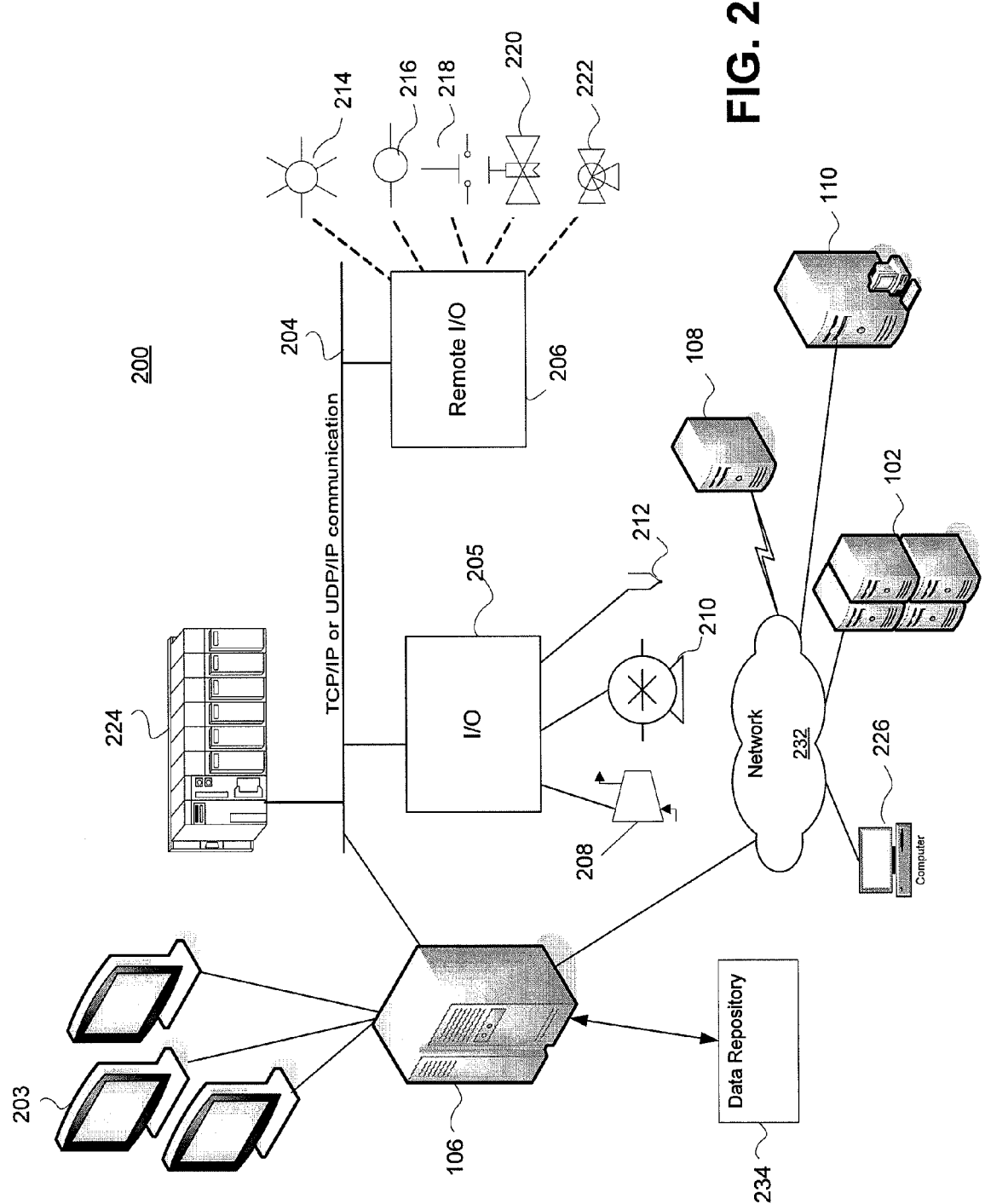
FIG. 2 shows a diagram of a computer system that may be used to implement various aspects of the disclosure.

FIG. 2 shows a diagram of a computer system 200 that includes a DCS 106 that performs as the controlling entity for automation devices. DCS 106 may directly or indirectly control automation devices located within the scope of a process unit. In an embodiment, display devices 203 may give a visual representation of the layout of process unit 104 (FIG. 1) with an overlay of the control and instrumentation devices utilized to operate process unit 104.

In an aspect of the disclosure, automation devices may be directly controlled through DCS 106 via a TCP/IP (or UDP/IP) 204 communication pathway. In an embodiment, DCS 106 may include I/O controllers 205 and 206 which may be situated between the automation devices and the DCS 106. For instance, automation devices may include compressor 208, pump 210, and thermocouple 212. In another embodiment, remote I/O controller 206 may be situated between DCS 106 and automation devices such as pilot light 214, relay 216, push button 218, gate valve 220, and/or mixing valve 222. Those skilled in the art will realize that numerous additional automation devices may be connected to DCS 106.

In another aspect of the disclosure, DCS 106 may also be in communication with a programmable logic controller (PLC) or programmable controller 224, which is typically a digital computer, and is often used for automation of industrial processes (e.g., control of machinery on factory assembly lines, control of chemical processes, control of amusement rides, and control of lighting fixtures). Unlike general-purpose computers, a PLC 224 is designed for multiple inputs and output arrangements, extended temperature ranges, immunity to electrical noise, and resistance to vibration and impact. Programs to control machine operation are typically stored in battery-backed or non-volatile memory. The DCS 106 may control various inputs and outputs via PLC 224.

In an aspect of the disclosure, a plurality of user computers or workstations such as 108 and 226 may be coupled to DCS 106 via a network 232. User computers or workstations 108 and 226 may provide decision makers with a user interface for displaying information to assist in troubleshooting process problems.

The term "network" as used herein and depicted in the drawings should be broadly interpreted to include not only systems in which devices are coupled together via one or more communication paths, but also stand-alone devices that may be coupled, from time to time, to such systems. Consequently, the term "network" includes not only a "physical network" but also a "content network," which is comprised of the data—attributable to a single entity—which resides across all physical networks.

In an aspect of the disclosure, RPM 102 may also be in communication with DCS 106 and user computers 108 and 226 through network 232. RPM 102 may directly or indirectly collect process variable data from DCS 106 and record them for resolving process upsets. In another embodiment, an integrated or non-integrated data repository 234 may also be utilized to store collected process data.

In an aspect of the disclosure, Expert System 110 may be used to assist in troubleshooting process issues. For instance, Expert System 110 may be in communication with RPM 102, DCS 106, and various user workstations 108 and 226 through network 232 to communicate data associated with process upsets.

Figure 3:
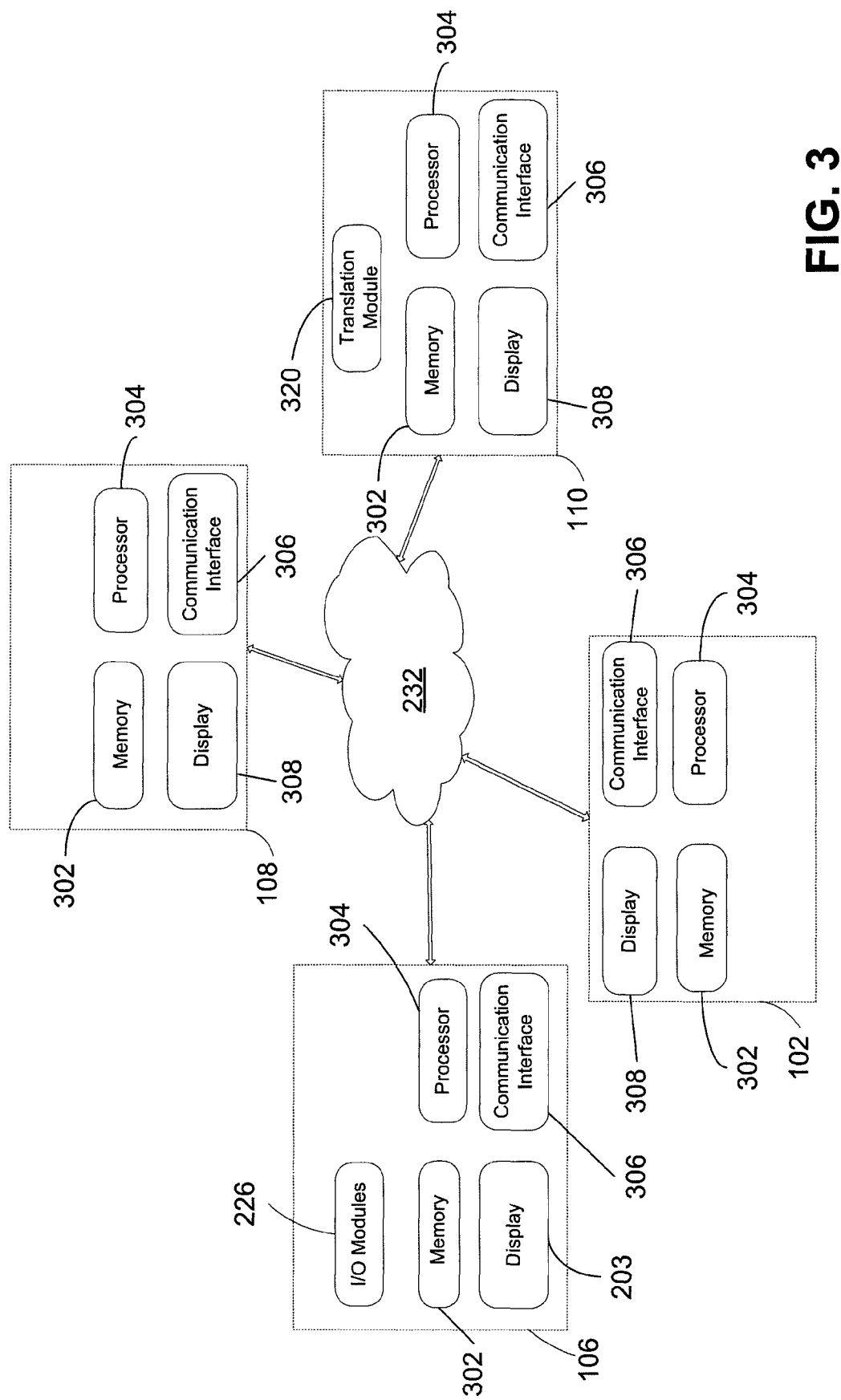
FIG. 3 illustrates system components of the computer system shown in FIG. 2 which may be used to implement various aspects of the disclosure.

FIG. 3 illustrates system components of the computer system shown in FIG. 2 which may be used to implement various aspects of the disclosure. In FIG. 3, RPM 102 is shown in communication with DCS 106, user computer 108, and ES 110 via network 232. One skilled in the art will appreciate that network 232 may be replaced with additional or different computer networks. For example, one or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

In an aspect of the disclosure, RPM 102 may be programmed with computer-executable instructions to receive data from DCS 106 and or user computer 108, format the requests and transmit the requests to Expert System 110. In one embodiment of the disclosure, requests for data are in the form of documents that are in extensible markup language (XML) format.

In FIG. 3, RPM 102 may include memory 302, processor 304, communication interface 306 and display 308. User computer 108 and ES 110 may also contain comparable components to process data received from DCS 106 and RPM 102. In addition, ES 110 may also include a translation module 320 for processing and translating and/or transforming data from RPM 102.

Figure 4:
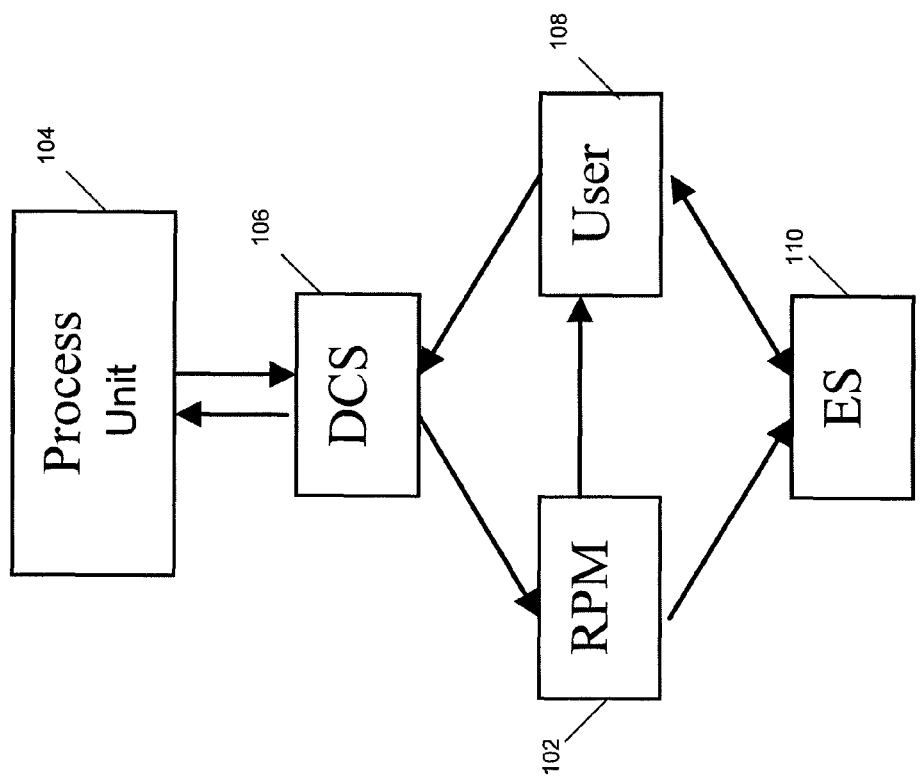
FIG. 4 illustrates a supplemental work process or method for troubleshooting process issues in accordance with various aspects of the disclosure.

FIG. 4 illustrates a work process or method for troubleshooting process issues in accordance with various aspects of the disclosure. In FIG. 4, information from RPM 102 may be transmitted to ES 110 and user computer 108. The data received by ES 110 may be used to troubleshoot a current or unforeseen process issue in progress on process unit 104. In an embodiment, ES 110 may be running real time and not as an offline process module.

In an aspect of the disclosure, ES 110 may recommend a solution to the process issue and transmit that recommendation to the user computer 108 for integration with graphical, analytical, statistical, translated, transformed or other data received from RPM 102. A final resolution to the process issue may then be transmitted to DCS 106 for implementation.

Figure 5:
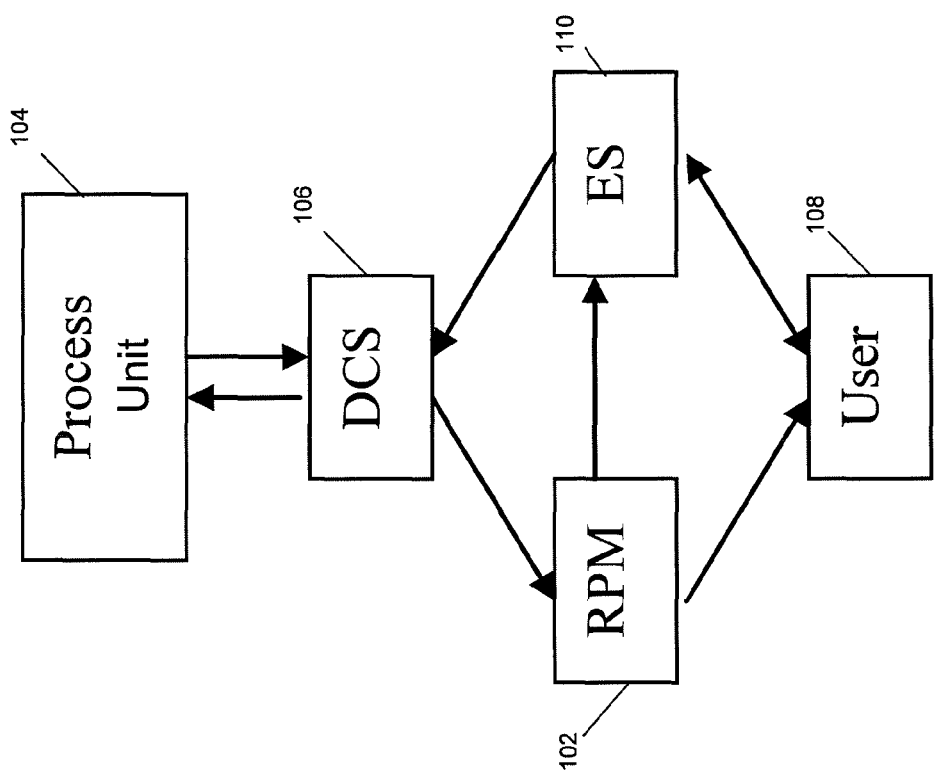
FIG. 5 illustrates an additional automated work process or method for troubleshooting process issues in accordance with various aspects of the disclosure.

FIG. 5 illustrates another work process or method for troubleshooting process issues in accordance with various aspects of the disclosure. In FIG. 5, information from RPM 102 may be transmitted to ES 110 and user computer 108. The data received by ES 110 may be used to troubleshoot a current or unforeseen process issue in progress on process unit 104. In an embodiment, ES 110 may be running real time and not as an offline module or component.

In an aspect of the disclosure, ES 110 may determine a solution to the process problem and transmit the solution to DCS 106 for direct and automatic implementation. User computer 108 may monitor the solution from ES 110 as well as information received from RPM 102.

In an aspect of the disclosure, a transition time period from the embodiment described in FIG. 4 to the embodiment described in FIG. 5, may be utilized in order to verify ES 110 output. In an embodiment, the translated or transformed data from RPM 102 may have to be adjusted and/or translated so that ES 110 may determine a solution consistent with a solution independently provided by user computer 108. For instance, graphical and/or analytic data from RPM 102 may be quantitative in nature, whereas, the data used by the Expert System data may be more qualitative in nature.

In an embodiment of the disclosure, translation and/or transformation of data from RPM 102 may be executed by translation module 320 (FIG. 3) in ES 110. Translation module 320 may execute an algorithm temporarily or permanently stored in memory 302 of ES 110.

The following exemplary embodiment is used for explanatory purposes and is not intended to be limiting to the scope of the disclosure. For instance, the temperature of a C5/C6 isomerization process unit reactor bed may need to be analyzed. Those skilled in the art will realize that additional process variables other than temperature may also be analyzed and controlled by the methods of this disclosure.

FIG. 6 illustrates a table showing the day and time 602 that a reactor bed temperature RxBedTemp1 604 was recorded in accordance with an aspect of the disclosure. For instance, RxBedTemp1 604 shows temperatures for dates ranging from Jul. 14, 2008 to Aug. 15, 2008 for a particular C5/C6 isomerization process unit. Those skilled in the art will realize that the portion of data shown is merely illustrative. Those skilled in the art will realize the absence of unit measurements here within is irrelevant to the scope and intent of this embodiment.

FIG. 6 also shows the change of temperature of the reactor bed from the previous day measurement at 606. In an aspect of the disclosure, statistical confidence interval values of the $25^{th}$ percentile 608, $50^{th}$ percentile 610, and $75^{th}$ percentile 612 may be calculated. In an embodiment, these percentiles may be calculated using a statistical confidence interval calculation basis period of the previous 30 days (which includes the current day). Those skilled in the art will realize that the choice of statistical confidence interval values and statistical confidence interval calculation basis period shown above are merely illustrative.

FIG. 6 illustrates in tabular form calculations to determine if the reactor bed temperature lies within the middle of the 50% of data (does the temperature fall between the first and third quartile) at 614. In addition, FIG. 6 also illustrates calculations to determine average bed temperature using an average calculation basis period of the previous 30 days if the data is within the middle 50% of data at 616. Those skilled in the art will realize that the choice of average calculation basis period used above is merely illustrative.

Next, a standard deviation 620 may be calculated (see intermediate step 618) using the average calculation period of the previous 30 days (including the current day) if these 30 data points lie within the middle two quartiles of the distributed data in accordance with an aspect of the disclosure. Those skilled in the art will realize that the choice of average calculation basis period used above is merely illustrative.

Then in an embodiment, a comparison of the standard deviation 620 to the change in temperature 606 between the current day and the previous day may be determined by calculating the ratio 622. If the calculated absolute value of the ratio 622 is greater than the high level cut-off point of 10, then ES 110 may assign a high level of confidence 624 in solutions it determines for the process variable deviation. In an aspect of the disclosure, ES 110 may also highly prioritize troubleshooting of this variable. Those skilled in the art will realize the choice of all cut-off points here within are merely illustrative.

In another aspect of the disclosure, if the calculated absolute value of the ratio 622 is greater than the medium level cut-off point of 3, but less than the high level cutoff point of 10, then ES 110 may assign a medium level of confidence 624 in solutions it determines for the process variable deviation. In an aspect of the disclosure, ES 110 may also prioritize troubleshooting of this variable to an extent less than the variable that was determined above.

In another aspect of the disclosure, if the calculated absolute value of the ratio 622 is less than the low level cut-off point of 3, then ES 110 may assign a low level of confidence 624 in solutions it determines for the process variable deviation. In an aspect of the disclosure, ES 110 may also deemphasize prioritization for troubleshooting of this variable as compared to the variables that were determined above.

For further clarity, the following listing describes the specific algorithm illustrated in FIG. 6 to determine the values listed in FIG. 6.

Tag 602=Time=the day and time the data was recorded in RPM

Tag 604=RxBedTemp1=the temperature of reactor bed #1

Tag 606=Delta RxBedTemp1=the change in temperature of this bed from the previous day Tag 608=25th Percentile=the value of the first quartile based only on the previous 30 days of data Tag 610=50th Percentile=the value of the second quartile based only on the previous 30 days of data Tag 612=75th Percentile=the value of the third quartile based only on the previous 30 days of data Tag 614=Does RxBedTemp1 Lie within the Middle 50% of Data=Is the numerical value of RxBedTemp1 between the first and third quartiles? 1=yes, 2=no Tag 616=Average RxBedTemp=Computes the average RxBedTemp1 over the past 30 days if the data is within the middle 50% of data Tag 618=Intermediate Calculation=This is an intermediate calculation to determine the standard deviation Tag 620=Standard Deviation of the Middle 50% of Data=Calculates the standard deviation for the middle 50% of data over the past 30 days Tag 622=Ratio=Delta RxBedTemp1 divided by the standard deviation Tag 624=Alarm=HIGH: |Ratio|>10, MEDIUM: 3<|Ratio|<10, and LOW: |Ratio|<3

Figure 7:
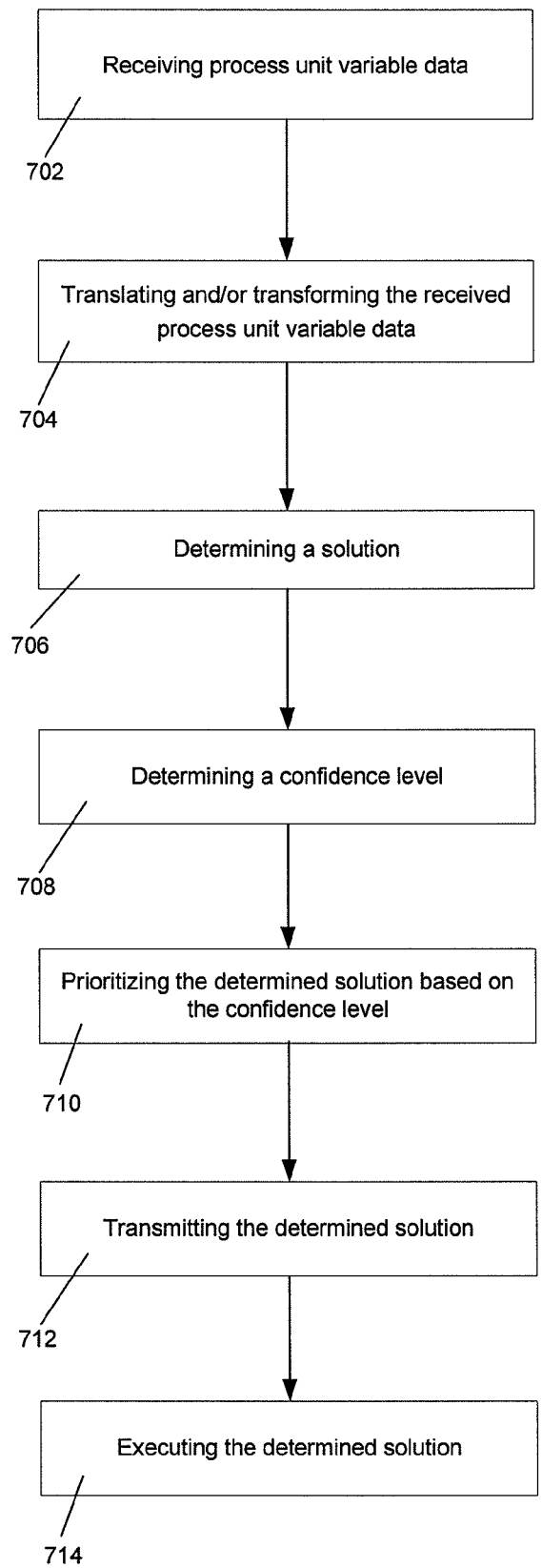
FIG. 7 illustrates a flow diagram in accordance with an embodiment of the disclosure.

In an aspect of the disclosure, a method of troubleshooting a process unit 104 upset event or an anticipated process unit 104 upset event for a process unit may be implemented. Referring to FIG. 7, an Expert System 110 may receive process unit variable data for the event based upon a determination of a process unit event upset as shown in step 702. Next, in step 704, the process unit variable data may be translated and/or transformed. In step 706, a solution may be determined based on the received process unit variable data. A confidence level may be determined for the determined solution in step 708. In an embodiment, the confidence level may be determined in tandem with step 706. The determined solution may be prioritized in step 710 based on the confidence level. In step 712, the determined solution may be transmitted to a distributed control system 106 for automatic execution as shown in step 714. Those skilled in the art will realize that these prioritized solutions are derived from analysis of alarm 624 and from various combinations of process variables. In another aspect of the disclosure, prioritization of determined solutions may also be based on previous day results since ΔT (for example) may be corrected one day but still generate an alarm.

In an aspect of the disclosure, the recited parameters may be adjustable by a process technical expert or user. For instance, some of the parameters that may be adjusted include:

1) n in n*σ for High, Medium, and Low criteria,
2) Number of days σ is based on,
3) Breakup of data "confidence intervals"

Furthermore, those skilled in the art will realize that the specific numbers involved in the above exemplary embodiment may be modified as per a process technology expert's experience for different process unit types, process unit locations, and/or customer requirements. For example the standard deviation may use additional data points or fewer data points or non-consecutive and segmented data points of data quality issues exist, and may also exclude the two 25% ends on data, and the ratio cut-offs for the alarms.

While the disclosure has been described with respect to specific examples including presently preferred modes of carrying out the invention, those skilled in the art will appreciate that there are numerous variations and permutations of the above described systems and techniques that fall within the spirit and scope of the invention.

The invention claimed is:

1. A method of troubleshooting a process unit upset event for a process unit, the method comprising:
   receiving process unit variable data for the process unit upset event;
   translating the received process unit variable data;
   determining a solution based on the received process unit variable data;
   determining a confidence level in the determined solution based on the translated variable data, wherein the confidence level is determined by calculating a ratio of a standard deviation of data that lies between a middle of two quartiles and a change in process variable data over a time period,
   prioritizing the determined solution based on the determined confidence level; and
   transmitting the determined solution to a distributed control system for implementation of the determined solution.

2. The method of claim 1, wherein the time period comprises one day.

3. The method of claim 1, wherein the calculated ratio is compared to a predetermined confidence level.

4. The method of claim 3, wherein the predetermined confidence level comprises a ratio of greater than 10.

5. The method of claim 4, wherein the ratio of greater than 10 represents a high confidence level.

6. The method of claim 3, wherein the predetermined confidence level comprises a ratio of between 3 and 10.

7. The method of claim 6, wherein the ratio of between 3 and 10 represents a medium confidence level.

8. The method of claim 3, wherein the predetermined confidence level comprises a ratio of less than 3.

9. The method of claim 8, wherein the ratio of less than 3 represents a low confidence level.

10. The method of claim 1, wherein the process variable data comprises temperature data.

11. The method of claim 1, wherein the process variable data comprises pressure data.

12. The method of claim 1, wherein the process variable data comprises level data.

13. The method of claim 1, wherein the process variable data comprises flow data.

14. The method of claim 1, wherein the process variable data includes laboratory unit data.

15. The method of claim 1, wherein the process variable data includes analytical process (chemical component analysis) unit data.

16. A method of troubleshooting a process unit upset event for a process unit, the method comprising:
   receiving process unit variable data for the process unit upset event at an expert system;
   translating at the expert system the received process unit variable data;
   determining at the expert system a solution based on the received process unit variable data;
   determining a confidence level in the determined solution at the expert system based on the translated variable data, wherein the confidence level is determined by calculating a ratio of a standard deviation of data that lies between a middle of two quartiles and a change in process variable data over a time period; and
   transmitting the determined solution to a distributed control system for automatic implementation of the determined solution.

17. A method of troubleshooting a process unit upset event for a process unit, the method comprising:
   receiving process unit variable data for the process unit upset event;
   translating the received process unit variable data;
   determining a solution based on the received process unit variable data;
   determining a confidence level in the determined solution based on the translated variable data, wherein the confidence level is determined by calculating a ratio of a standard deviation of data that lies between a middle of two quartiles and a change in process variable data over a time period, wherein the calculated ratio is compared to a predetermined confidence level; and
   transmitting the determined solution to a distributed control system; and executing the determined solution automatically through the distributed control system.

* * * * *